Patented Sept. 29, 1953

2,653,962

UNITED STATES PATENT OFFICE 2,653,962

OXIDATION CONTROL

Robert L. Mitchell and Oren V. Luke, Corpus Christi, Tex., assignors to Celanese Corporation of America, New York, N. Y., a corporation of Delaware No Drawing. Application July 28, 1951, Serial No. 239,178

16 Claims. (Cl. 260—452)

This invention relates to the oxidation of organic compounds and relates more particularly to the oxidation of aliphatic hydrocarbons and to processes for the recovery of the oxygenated products of said reaction.

An object of this invention is the provision of a novel process for the treatment of the mixture of oxygenated organic compounds obtained as a product of the oxidation of aliphatic hydrocarbons.

Another object of this invention is to provide a modified process for recovering the hydrocarbon oxidation products formed during the liquid phase oxidation of aliphatic hydrocarbons.

A further object of this invention is the treatment of the mixture of oxygenated organic compounds obtained as a reaction product during the liquid phase oxidation of aliphatic hydrocarbons involving recycle of the unreacted hydrocarbons, whereby a variation in product distribution may be attained.

Other objects of this invention will appear from the following detailed description.

Numerous processes for the direct oxidation of aliphatic hydrocarbons such as propane, butane, isobutane, pentane, etc., or mixtures of these hydrocarbons, with air or oxygen have been proposed. The oxidation may be carried out in either the liquid or the vapor phase. In the case of the liquid phase oxidation of hydrocarbons, the hydrocarbons to be oxidized are usually placed in a reaction vessel and air or oxygen is introduced therein to effect the desired oxidation forming various ketones, alcohols, esters and acids such as acetic acid. The oxidation reaction is favored by elevated temperatures and the effectiveness of the air or oxygen introduced is considerably enhanced when operating under high pressure. Accordingly, the liquid phase oxidation of aliphatic hydrocarbons is normally carried out under pressures of 200 to 2000 pounds per square inch and at temperatures of from 125 to 225° C. Under these conditions, the oxygen is introduced at a controlled rate so that it is usually completely consumed and, as the reaction proceeds, a mixture of water of reaction, the oxygenate organic compounds formed, inert gases and unreacted hydrocarbon distills over. In order to recover the oxygenated organic compounds the overhead vapors from the oxidation reaction are condensed. The condensate, upon standing, settles out into two phases, an upper hydrocarbon phase comprising unreacted hydrocarbon and a lower aqueous phase comprising the water of reaction. The organic reaction products present in the condensate partition between the phases, the concentration of the products in each phase depending upon the solubility and distribution coefficient of each of the compounds present. The hydrocarbon phase is usually returned to the reaction zone by direct recycle while the aqueous phase is separated from the hydrocarbon phase by decantation and the organic compounds present in the separated aqueous phase are recovered therefrom by subjecting the aqueous phase to suitable purification procedures. The distribution of products between the upper hydrocarbon phase and the lower aqueous phase may be varied, to some degree, by suitable changes in the condensate temperature. As a practical matter, repeated changes in the condensate temperature to attain a more favorable adjustment of the partition coefficients of the organic compounds present between the hydrocarbon and the aqueous phases is undesirable since such changes will include raising the temperature of the condensate to moderately high temperatures. The use of high condensate temperatures is technically unsound since the economics of the process are greatly in the favor of low condensate temperatures. This is particularly true because low condensate temperatures tend to condense a major part of the unreacted hydrocarbon and the reduction in the amount of hydrocarbon to be recovered subsequently from the uncondensed vapor residue permits a much smaller hydrocarbon recovery system to be utilized, thus greatly decreasing the capital investment necessary. Unfortunately, low condensate temperatures do not usually produce the most favorable partition of the oxygenated organic compounds between the hydrocarbon layer and the aqueous layer, and means for enabling a more favorable partition and a more effective recovery of the oxygenated products from the condensate has been sought.

We have now found that the recovery of oxygenated organic compounds from the condensed reaction products of the liquid phase oxidation of aliphatic hydrocarbons may be greatly expedited without employing undesirably high condensate temperatures by collecting the condensate in a decanter or other suitable vessel, allowing the condensate to phase out into an upper hydrocarbon layer and a lower aqueous layer, and then allowing water in the form of finely divided droplets to pass down through the upper hydrocarbon layer of the condensate and to merge with the lower aqueous layer. The passage of the water droplets down to the hydrocarbon layer of the condensate serves to extract or wash certain of the oxygenated organic compounds from the hydrocarbon layer. This decreases the quantity of oxygenated products present in the hydrocarbon layer and thus decreases the quantity recycled to the reactor when the hydrocarbon layer is recycled. This method of decreasing the recycle enables an effective control of the hydrocarbon level in the reactor to be attained.

Furthermore, the addition of water to the hydrocarbon phase of the condensate in the manner described above, permits a degree of control over the products of oxidation in favor of the formation of ketones, alcohols and esters, with a corresponding decrease in the quantity of acetic acid produced. The extraction of said ketones, alcohols and esters from the hydrocarbon layer prevents the return of said compounds to the reactor in the hydrocarbon recycle and avoids any further oxidation of said compounds. Advantageously, the water passed through the hydrocarbon phase of the condensate in accordance with our novel process, may vary from 0.005 to 0.05 part by weight per minute for each part by weight per minute of the hydrocarbon phase recycled back to the reactor. The separation of the oxygenated organic compounds from the aqueous layer may be carried out by a combination of fractional and azeotropic distillation operations.

Conversely, the distribution of reaction products may be changed in favor of acetic acid, for example, by introducing additional hydrocarbon in finely-divided form into the lower portion of the aqueous phase of the condensate and allowing said finely-divided hydrocarbon to pass upward through the lower aqueous layer and to extract therefrom a part of the ketones, alcohols and esters present therein. The amount extracted from the aqueous phase is, of course, a function of the volume of hydrocarbon introduced into the aqueous layer. This expedient increases the volume of hydrocarbon in the reactor and, by carrying that portion of the ketones, alcohols and esters which would normally be in the aqueous layer back to the reactor, further oxidation of these compounds is effected and increased quantities of acetic acid are thus obtained. In either case, the supplementary extraction also provides a very practical means of adjusting the level of the reactants in the reaction zone. The hydrocarbon passed upward through the aqueous phase may vary from 0.01 to 0.1 part by weight for each part by weight of the aqueous phase separating out.

The water or hydrocarbon introduced in droplet form into either the hydrocarbon layer or the aqueous layer, respectively, may be distributed therein by means of spargers disposed within either one or both of said layers and the extractant forced through said spargers into one or both phases in the desired amount to effect said supplementary, intermediate extraction.

In order further to illustrate the novel process of our invention the following example is given:

*Example*

1300 parts by weight of glacial acetic acid containing 0.3% by weight of chromium acetate is charged to a stainless steel reactor fitted with valves for introducing liquid hydrocarbon and air. Liquid n-butane is introduced into the reactor at a rate of approximately 3.5 parts by weight per minute and air is introduced through a sparger at the rate of 16.35 parts by weight per minute. The pressure is maintained at 815 pounds per square inch absolute and the temperature is raised slowly. At a reaction temperature of about 330° F., a complete consumption of all of the oxygen present in the air takes place as the latter passes through the liquid reaction mixture. At the temperature of reaction, a mixture of vapors distills overhead. The overhead vapors from the reactor are chilled in a condenser held at 40° F. and the condensate passed to a decanter where it separates into two phases. Water is introduced into the upper hydrocarbon layer in the decanter at the rate of 2 to 3 parts by weight per minute and the water thus introduced is permitted to fall downwardly into the lower aqueous layer. The combined aqueous layer is continuously withdrawn from the decanter and the hydrocarbon layer is continuously recycled to the reactor at a rate of about 250 parts by weight per minute. After the system has been in operation for a continuous run of 24 hours, analyses of the products and material balance shows that for each 100 parts by weight of n-butane consumed, there is produced 79.22 parts acetic acid, 12.55 parts methyl acetate, 7.20 parts ethyl acetate, 1.85 parts of alcohols, and 6.58 parts of methyl ethyl ketone. When the process is operated without a supplemental water extraction of the hydrocarbon phase of the condensate, the yields obtained differ markedly in character. Thus, without said water extraction it is observed that for each 100 parts by weight of n-butane consumed there is obtained 103.7 parts of acetic acid, 6.37 parts of methyl acetate, 2.88 parts of ethyl acetate, 1.03 parts of alcohols and 4.53 parts of methyl ethyl ketone.

It is to be understood that the foregoing detailed description is given merely by way of illustration and that many variations may be made therein without departing from the spirit of our invention.

Having described our invention, what we desire to secure by Letters Patent is:

1. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separated phases are contiguous, subjecting at least one of said phases to extraction to remove oxygenated organic compounds therefrom.

2. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separated phases are contiguous, subjecting the aqueous phase to extraction to remove oxygenated organic compounds therefrom by passing aliphatic hydrocarbon upward through said aqueous phase.

3. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separated phases are contiguous, subjecting the hydrocarbon phase to extraction to remove oxygenated organic compounds therefrom by passing water downward through said hydrocarbon phase.

4. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separated phases are contiguous, subjecting the aqueous phase to extraction to remove oxygenated organic compounds therefrom by passing aliphatic hydrocarbon upward through said aqueous phase and simultaneously subjecting the hydrocarbon phase to extraction to remove oxygenated organic compounds therefrom by passing water downward through said hydrocarbon phase.

5. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separate phases are contiguous, subjecting the aqueous phase to extraction to remove oxygenated organic compounds therefrom by passing 0.1 to 1.0 part by weight of aliphatic hydrocarbon upward through said aqueous phase for each part by weight of said aqueous phase separating out.

6. In the production of oxygenated organic compounds from aliphatic hydrocarbons by a process which includes passing an oxygen-containing gas through a liquid reaction mixture containing an aliphatic hydrocarbon, the steps which comprise allowing a part of said reaction mixture including unreacted hydrocarbon, water of reaction and other oxidation products to distill over, condensing the overhead distillate, allowing the condensate to separate into a hydrocarbon phase and an aqueous phase and, while said separated phases are contiguous, subjecting the hydrocarbon phase to extraction to remove oxygenated organic compounds therefrom by passing 0.005 to 0.05 part of water downward through said hydrocarbon phase for each part by weight of said hydrocarbon phase separating out.

7. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting at least one of said phases to extraction to remove oxygenated organic compounds therefrom.

8. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the aqueous phase to extraction to remove oxygenated organic compounds therefrom by passing butane upward through said aqueous phase.

9. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the butane phase to extraction to remove oxygenated organic compounds therefrom by passing water downward through said butane phase.

10. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the aqueous phase to extraction to remove oxygenated organic compounds therefrom by passing .01 to 0.1 part by weight of butane upward through said aqueous phase for each part by weight of said aqueous phase separating out.

11. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the butane phase to extraction to remove oxygenated organic compounds therefrom by passing 0.005 to 0.05 part by weight of water downward through said butane phase for each part by weight of said butane phase separating out.

12. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase containing a solution of oxygenated products as solute dissolved in butane as the solvent, and an aqueous phase containing a solution of oxygenated products as solute, dissolved in water as the solvent, and, while said separated phases are contiguous, passing one of said solvents as an extracting solvent through the solution containing the other of said solvents and into the solution containing said extracting solvent and recycling the butane phase back to the reaction mixture.

13. In the production of oxygenated organic compounds from butane by a process which includes passing an ogygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate ot separate into a butane phase and an aqueous phase and, while said separated phases are contiguous, subjecting the aqueous phase to extraction to remove oxygenated organic compounds therefrom by passing butane upward through said aqueous phase and recycling the butane phase back to the reaction mixture.

14. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the butane phase to extraction to remove oxygenated organic compounds therefrom by passing water downward through said butane phase and recycling the butane phase back to the reaction mixture.

15. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separated phases are contiguous, subjecting the aqueous phase to extraction to remove oxygenated organic compounds therefrom by passing .01 to 0.1 part by weight of butane upward through said aqueous phase for each part by weight of said aqueous phase separating out and recycling the butane phase back to the reaction mixture.

16. In the production of oxygenated organic compounds from butane by a process which includes passing an oxygen-containing gas through a liquid reaction mixture comprising a solution of butane containing an oxidation catalyst, the steps which comprise allowing a part of said reaction mixture including unreacted butane, water of reaction, and other oxidation products to distill over, condensing the overhead distillate, allowing the condensate to separate into a butane phase and an aqueous phase and, while said separation phases are contiguous, subjecting the butane phase to extraction to remove oxygenated organic compounds therefrom by passing 0.005 to 0.05 part by weight of water downward through said butane phase for each part by weight of said butane phase separating out and recycling the butane phase back to the reaction mixture.

ROBERT L. MITCHELL.
OREN V. LUKE.

References Cited in the file of this patent

UNITED STATES PATENTS

| Number | Name | Date |
|---|---|---|
| 2,265,948 | Loder | Dec. 9, 1941 |
| 2,287,125 | Owen et al. | June 23, 1942 |
| 2,540,143 | Solomon | Feb. 6, 1951 |
| 2,543,038 | McGrath | Feb. 27, 1951 |
| 2,568,717 | Burton et al. | Sept. 25, 1951 |